United States Patent
Knop et al.

[11] Patent Number: 5,921,275
[45] Date of Patent: Jul. 13, 1999

[54] APPARATUS FOR REDUCING NOISE GENERATED BY THE FLOW OF WATER THROUGH A WATER VALVE

[75] Inventors: David G. Knop, Mooresville; Michael R. DuHack, Indianapolis, both of Ind.

[73] Assignee: Emerson Electric Co., St. Louis, Mo.

[21] Appl. No.: 08/825,045

[22] Filed: Mar. 27, 1997

[51] Int. Cl.$^6$ .............................. F16K 31/12; F16K 47/00
[52] U.S. Cl. ...................... 137/498; 137/505.25; 251/122
[58] Field of Search ............................. 137/498, 505.25; 251/122, 118, 120

[56] References Cited

U.S. PATENT DOCUMENTS

| | | | |
|---|---|---|---|
| 3,195,561 | 7/1965 | Sovitzky | 251/120 |
| 3,480,040 | 11/1969 | Erickson | 251/120 |
| 3,890,999 | 6/1975 | Moskow | 137/505.25 |
| 3,926,211 | 12/1975 | MacLarty | 137/505.25 |
| 4,248,270 | 2/1981 | Ostrowski | 251/120 |
| 4,300,592 | 11/1981 | Hartley | 137/505.25 |
| 4,474,207 | 10/1984 | Rosenberg | 137/505 |
| 4,516,600 | 5/1985 | Sturman et al. | 137/505.25 |
| 4,543,985 | 10/1985 | Healy et al. | 137/505.25 |
| 4,621,788 | 11/1986 | DeLew et al. | 251/120 |
| 4,651,971 | 3/1987 | Donahue, Jr. | 251/118 |
| 4,825,903 | 5/1989 | Ochs et al. | 137/505.25 |
| 5,082,240 | 1/1992 | Richmond | 251/120 |
| 5,154,394 | 10/1992 | DuHack | 251/120 |
| 5,257,646 | 11/1993 | Meyer | 137/505.25 |
| 5,269,333 | 12/1993 | Richmond | 251/120 |
| 5,271,600 | 12/1993 | Saadi et al. | 251/120 |
| 5,329,966 | 7/1994 | Fenimore et al. | 137/613 |
| 5,396,918 | 3/1995 | Parker | 137/14 |
| 5,456,281 | 10/1995 | Teay | 137/505.46 |
| 5,509,407 | 4/1996 | Schuler | 128/205.24 |
| 5,522,422 | 6/1996 | Beck | 137/505.25 |
| 5,626,403 | 5/1997 | Beck et al. | 137/505.25 |

*Primary Examiner*—Henry Bennett
*Assistant Examiner*—Joanne Y. Kim
*Attorney, Agent, or Firm*—Mark D. Becker

[57] ABSTRACT

A fluid valve including a valve body, a flow control member and a cavitation prevention assembly. The valve body has an inlet, an outlet, a fluid passage communicating fluid therebetween, and means for selectively opening and closing fluid communication between the inlet and the outlet. The flow control member is positioned within the fluid passage and has a central passage through which the fluid advances. The cavitation prevention assembly is positioned within the flow passage and is in flow communication with the inlet and the flow control member. The cavitation prevention assembly controls the pressure of the fluid entering the central passage to a level which is sufficiently low to prevent cavitation of the fluid.

24 Claims, 8 Drawing Sheets

APPARATUS FOR REDUCING NOISE GENERATED BY THE FLOW OF WATER THROUGH A WATER VALVE

BACKGROUND OF THE INVENTION

The present invention relates generally to water valves, and more specifically to an apparatus for reducing the noise generated by the flow of water through water valves used in household appliances such as dishwashers, icemakers and clothes washing machines.

Electrically operated water valves are commonly used in many household appliances such as dishwashers, clothes washers, and refrigerator icemakers. Such appliance water valves are generally controlled by a controller included in the appliance, thereby alternatively turning a water supply on and off as determined by the appliance programming. Such valves also generally include a flow control device which provides a constant water flow rate for all water supply pressures that can be reasonably anticipated. Such flow control devices generally comprise a flexible flow control washer supported by a rigid support. The flow control washer includes a flow control orifice communicating with an aperture in the support. The flow control washer is shaped so that water pressure forcing it against the support causes the flow control orifice to become smaller as the water pressure increases.

Such flow control devices tend to cause noise as the water flows through the valve. Noisy valves are undesirable, especially when used in appliances such as dishwashers and icemakers which operate within the living space of the home. These type of valves can be quite noisy at certain pressures and quiet at other water pressures.

One of the major sources of noise in the operation of an appliance water valve is "cavitation" of the water. Cavitation is the sudden formation and collapse of low-pressure bubbles in a liquid, such as water, as the liquid flows from an area of higher pressure to an area of lower pressure. As the low-pressure bubbles collapse, energy is released which causes structural vibrations within the appliance water valve. Such structural vibrations generally result in the production of noise.

In addition to noise, the structural vibrations due to cavitation may also cause damage to the appliance water valve. In particular, the components within the appliance water valve may be eroded, fatigued, or pitted due to cavitation. Hence, the operative life of the appliance water valve may be reduced by cavitation.

It has been determined that one of the major sources of cavitation is the pressure drop associated with the flow control device. As the flow control pressure drop becomes significant, especially at high water inlet pressures, the pressure on the outlet side of the flow control drops below the vapor pressure of the water and cavitation can occur. The noise generated by cavitation may be lessened by controlling the pressure drop across the flow control device.

One way to control the pressure drop across the flow control device is to create backpressure within the valve. Backpressure may be created a number of ways internal to the valve; however, if excessive backpressure is created, the water flow rate may change from the desired amount and may create an undesirable performance in the appliance. This is particularly of concern at low inlet water pressures.

What is needed therefore, is an appliance water valve which controls the pressure drop through the flow control, thereby reducing cavitation and the noise generated therefrom, but does not impede the flow rate of the water flowing therein. The apparatus must be capable of controlling the pressure drop at steady-state water flow conditions as well as in transient flow conditions and must be capable of operating at a wide range of water inlet temperatures.

SUMMARY OF THE INVENTION

In one aspect of the present invention a fluid valve assembly is disclosed. The fluid valve assembly includes a valve body which has an inlet, an outlet and a fluid passage which communicates fluid therebetween. The valve body further includes a means for selectively opening and closing the communication of the fluid between the inlet and the outlet. The fluid valve assembly also includes a flow control member. The flow control member is positioned within the fluid passage and has a central passage through which the fluid advances. Finally, the fluid valve assembly includes a cavitation prevention assembly which is positioned within the flow passage and is in flow communication with the inlet and the flow control member. The cavitation prevention assembly controls the pressure of the fluid entering the central passage to a level which is sufficiently low to prevent cavitation of the fluid.

In another aspect of the present invention an appliance valve noise suppression assembly is described. The noise suppression assembly includes a valve body, a flow of water having a valve inlet pressure, a flow control member, and a regulating means. The body defines an inlet, an outlet and a fluid passage which communicates therebetween. The flow control member is disposed in series with the inlet. The flow control member has a central passage through which the flow of water advances. The central passage interacts with the flow control member to limit the flow of water to a preselected level. The regulating means is disposed in series with the flow control member. The regulating means controls the pressure of the flow of water through the flow control member to a preselected level.

It is therefore an object of the present invention to provide a new and useful noise suppression assembly.

It is a further object of the present invention to provide a new and useful water valve assembly.

It is moreover an object of the present invention to provide a new and useful apparatus for suppressing the noise generated by a flow of water through a water valve.

It is yet another object of the present invention to provide an improved apparatus for suppressing the noise generated by a flow of water through a water valve.

It is further an object of the present invention to provide a water valve assembly which is relatively quiet.

It is moreover an object of the present invention to provide a water valve assembly which reduces cavitation.

It is yet another object of the present invention to provide a water valve assembly which is relatively quiet and has a relatively good flow rate.

It is a further object of the present invention to provide a water valve assembly which reduces cavitation and has a relatively good flow rate.

The above and other objects, features, and advantages of the present invention will become apparent from the following description and the attached drawings.

DETAILED DESCRIPTION OF THE INVENTION

Figure 1:
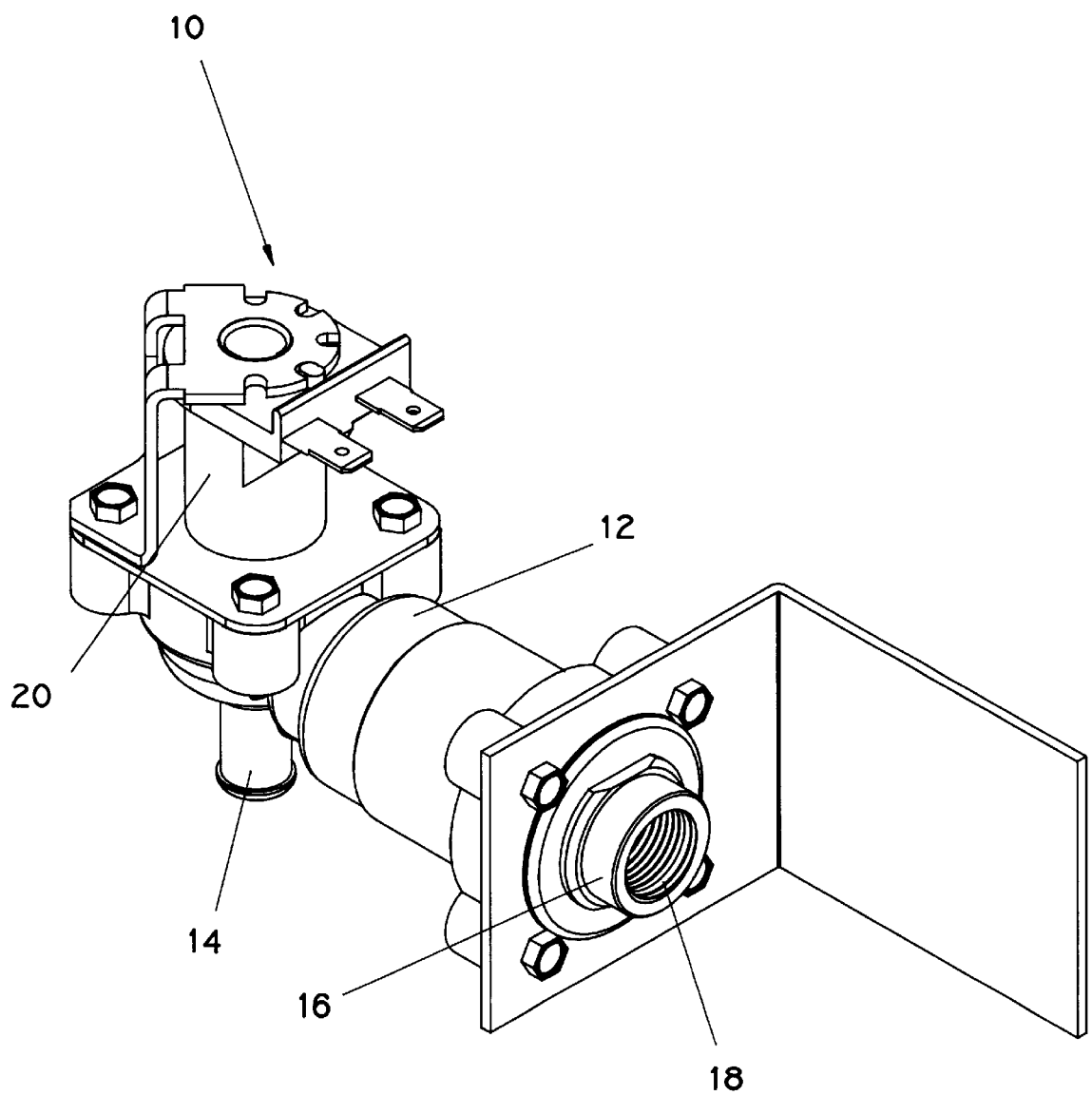
FIG. 1 is a view of an appliance water valve which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
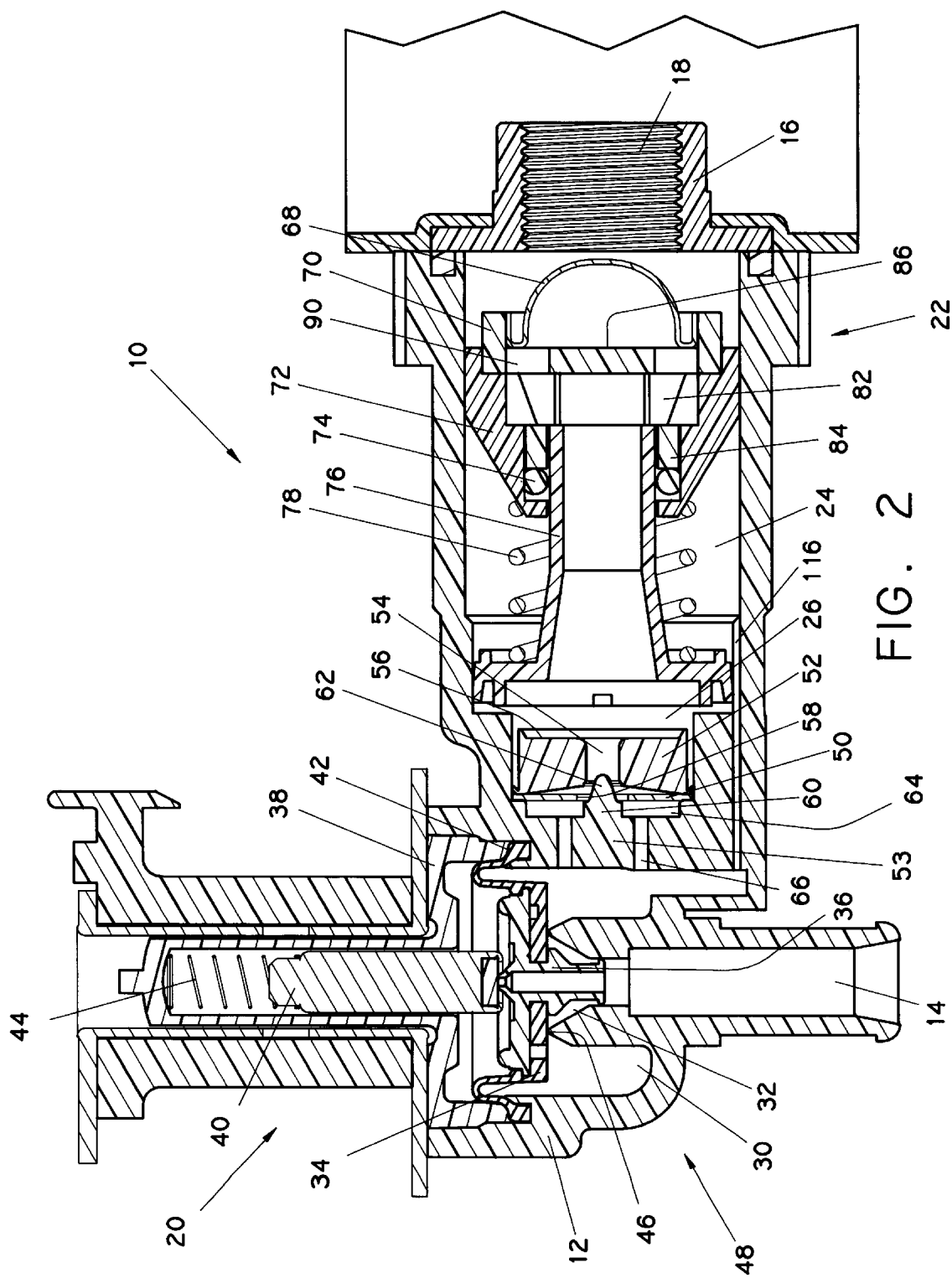
FIG. 2 is a cross sectional view of an appliance water valve which incorporates the features of the present invention therein.
Figure 3:
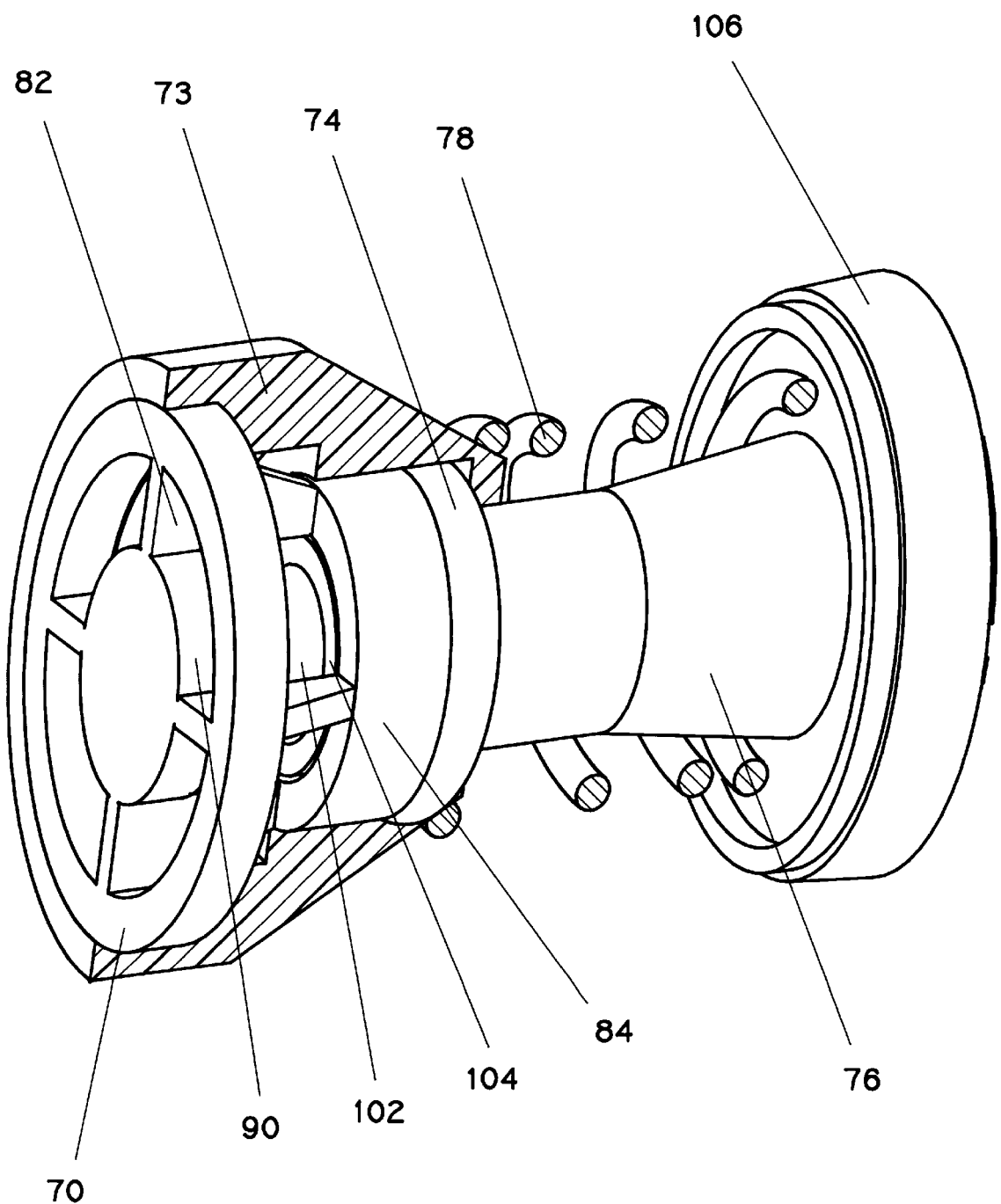
FIG. 3 is an isometric view with a partial cut-away showing the internal components of the cavitation prevention assembly of the appliance water valve of FIG. 2.

Referring now to FIGS. 1 and 2, there is shown an appliance water valve 10. The appliance water valve 10 includes a valve body 12 having an outlet 14 defined therein. Attached to the valve body 12 is an inlet member 16 having an opening 18 defined therein. The appliance water valve 10 further includes a valve actuator 20 and a cavitation prevention assembly 22.

The inlet member 16 is typically connected to a residential water line (not shown), thereby providing for a water flow to the inlet opening 18. The outlet 14 is typically a hose barb-type connector which is connected to a fill line of an appliance (not shown), such as a dishwasher, clothes washer, or an icemaker. The outlet 14 can also be connected to the fill line of the appliance with a threaded connection.

The valve body 12 defines a cavitation prevention chamber 24, a flow control chamber 26, a main chamber 30, and an outlet orifice 32. The cavitation prevention chamber 24, flow control chamber 26, main chamber 30, and the outlet orifice 32 are disposed between the inlet opening 18 and the outlet 14. When the valve actuator 20 is in the closed position, the inlet opening 18 is in fluid communication with the cavitatio prevention chamber 24, the flow control chamber 26 and the main chamber 30. When the valve actuator 20 is in the open position, the flow of water is allowed to advance from the main chamber 30 to the outlet orifice 32 and then to exit out the valve body 12 through the outlet 14.

The valve actuator 20 includes a diaphragm 34, a diaphragm insert 36, a guide tube 38, an armature 40 and a spring 44. The valve actuator 20 is sealingly engaged to the valve body 12 at a retention groove 42. The armature 40 is disposed in the guide tube 38, and is biased against the diaphragm insert 36 by a spring 44, thereby urging the diaphragm insert 36 and the diaphragm 34 against a valving surface 46. When the valve 10 is pressurized, a pressure differential exists across the diaphragm 34 which causes a seal between the diaphragm and the valving surface 46. The diaphragm 34 is made of a flexible material, such as ethylene propylene (EP) rubber, thereby providing desirable sealing characteristics when biased against the valving surface 46.

When the valve actuator 20 is in a closed position, such as shown in FIG. 2, the diaphragm is biased against the valving surface 46, thereby preventing water from flowing out of the main chamber 30 through the outlet orifice 32. However, when the valve actuator 20 is moved to an open position, i.e. a position wherein the diaphragm 34 is spaced apart from the valving surface 46, water is permitted to flow out of the main chamber 30 through the outlet orifice 32, thereby providing for a flow of water out of the outlet 14 and into the fill line of the appliance (not shown). Hence, the valve actuator 20 and the valve body 12 (including the valving surface 46), collectively referred to as a valve mechanism 48, cooperate to selectively control the advancement of water from the inlet opening 18 to the outlet 14.

Referring to FIG. 2, the flow control chamber 26 is disposed within the valve body 12 between the cavitation prevention chamber 24 and the main chamber 30. The flow control chamber 26 retains an inlet washer 50, a flow control member 52, and a bullet 53 which can be integral with the valve body 12 as shown in FIG. 2 or can be a separate piece.

The flow control member 52 is made of flexible material such as ethylene propylene (EP) rubber, and has a central passage 54 defined therein. The flow control member 52 flexes or deforms in response to variations in inlet water pressure exerted on an upstream surface 56 thereof. In particular, a higher inlet water pressure on the upstream surface 56 causes a greater amount of flexing or deformity of the flow control member 52, thereby reducing the diameter of the central passage 54. A lower inlet water pressure exerted on the upstream surface 56, causes the flexing or deformity of the flow control to be reduced, thereby increasing the diameter of the central passage 54.

The inlet washer 50 has a washer orifice 58 defined therein, and provides a surface on which the flow control member 52 is supported. The inlet washer is typically made of a metallic material, such as stainless steel.

The bullet 53 reduces the amount of cavitation, and hence the amount of noise, generated by the flow of water being advanced through the appliance valve 10. The bullet 53 either integral with the valve body 12 and therefore made from the same material or is made from a plastic material, such as polypropylene. The bullet 53 includes a bullet body 60 and a tip 62. The bullet 53 protrudes through the washer orifice 58 of the inlet washer 50 and a portion of the central passage 54 of the flow control member 52, such that the tip 62 is centrally aligned in the central passage 54. Since the bullet 53 is aligned with the central passage 54, a direct flow path or line of advancement of the flow of water exists.

The bullet 53 is configured to define a dispersion chamber 64. The main chamber 30 acts as a recombining chamber. The tip 62 of the bullet 53 disperses and directs the flow of water which is advancing through the flow control member 52 into the dispersion chamber 64. From the dispersion chamber 64, the flow of water is directed through a number of holes 66 defined in the body 12, and into the main chamber 30. The holes 66 are offset from the central passage 54.

When the flow of water exits the cavitation prevention chamber 24, it impinges upon the upstream surface 56 of the flow control member 52, and is redirected towards the central passage 54. The flow of water advancing through the central passage 54 contacts the tip 62 of the bullet 53. The bullet 53 disperses and directs the flow of water through the washer orifice 58 and into the dispersion chamber 64. Thereafter, the flow of water flows radially outward. The flow of water in the dispersion chamber 64 allows the flow streamlines to expand which reduces the velocity of the flow of water entering the holes 66 and thereby reduces an opportunity for cavitation. As the flow of water exits the holes 66 into the main chamber 30, further expansion in the flow streamlines occurs which allows for a greater reduction in velocity of the flow of water advancing through the valve 10.

Referring now to FIGS. 2 through 6, the cavitation prevention assembly 22 is disposed in the cavitation prevention chamber 24 of the valve body 12 between the flow control chamber 26 and the inlet member 16 (see FIG. 2). The cavitation prevention assembly 22 includes a screen 68, a tube retainer 70, an end plug 72, a piston seal 74, a piston tube 76, and a piston spring 78. The screen 68 inhibits debris particles, which may be contained in the incoming residential water flow, from reaching the cavitation prevention assembly 22 and the flow control member 52, or other components within the appliance water valve 10. The screen can be a separate component as is shown in FIG. 2 or can be integral with the tube retainer 70.

Figure 5A:
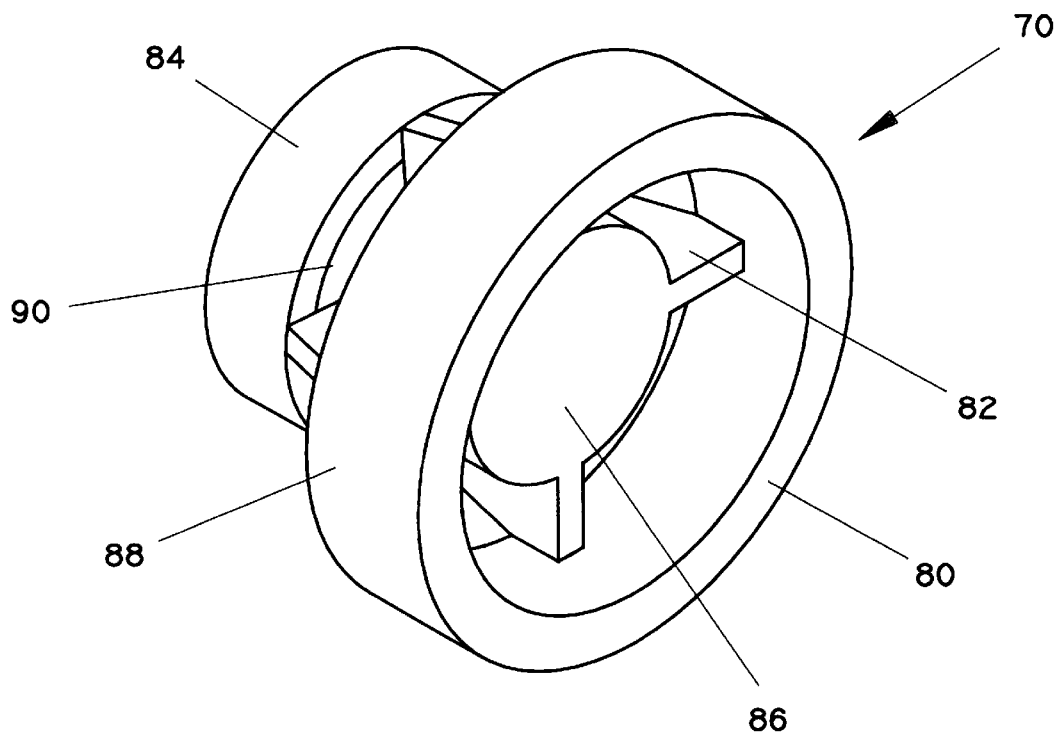
FIG. 5a is an enlarged isometric view of the tube retainer within the cavitation prevention assembly FIG. 2.
Figure 5B:
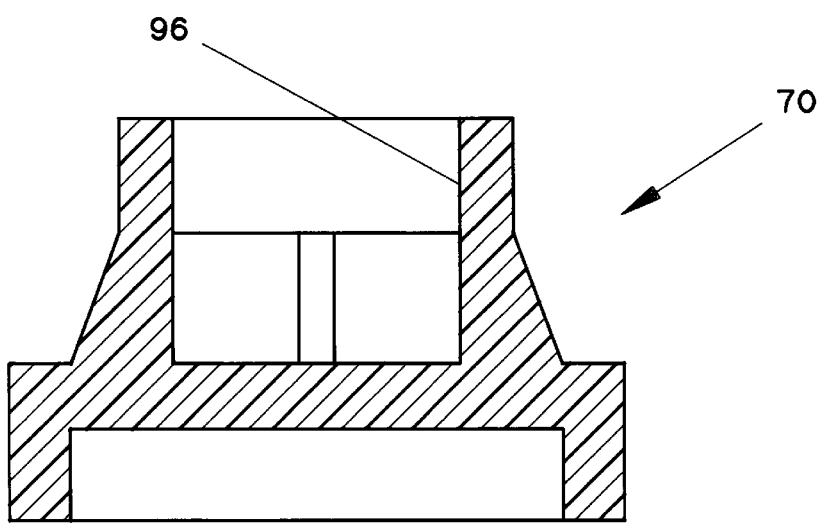
FIG. 5b is an enlarged cross sectional view of the tube retainer within the cavitation prevention assembly FIG. 2.

Referring to FIG. 5, the tube retainer 70 includes front surface 80, ribs 82, and an annulus 84. The front surface 80 has an inner surface 86 and an outer ring 88. The ribs 82 concentrically locate the outer ring 88 from the inner surface 86 and axial space the front surface 80 from the annulus 84. The axial spacing of the front surface 80 from the annulus 84 and the inner surface 86 and outer ring 88 creates a flow passage 90.

Figure 6A:
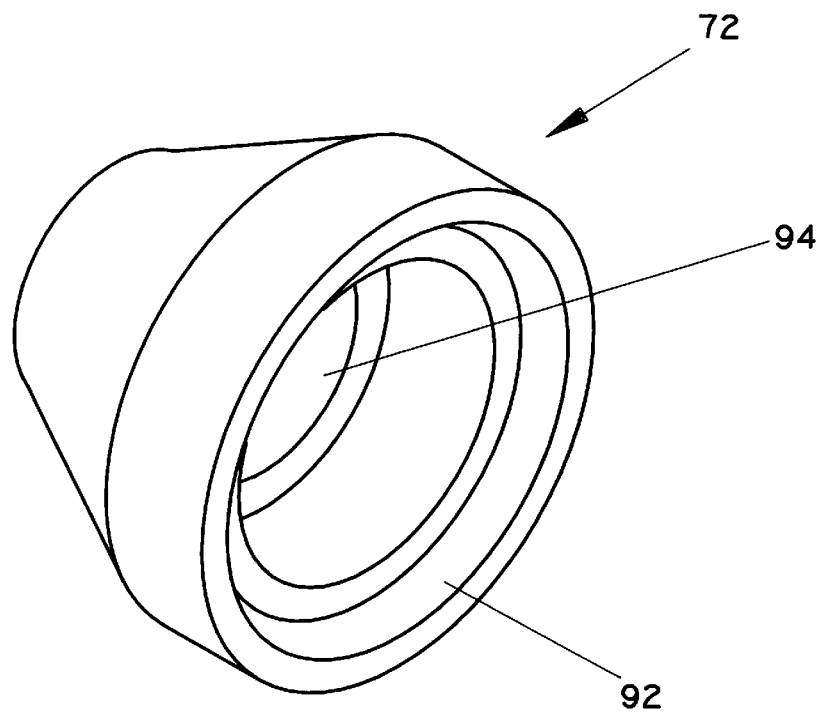
FIG. 6a is an enlarged isometric view of the end plug within the cavitation prevention assembly FIG. 2.
Figure 6B:
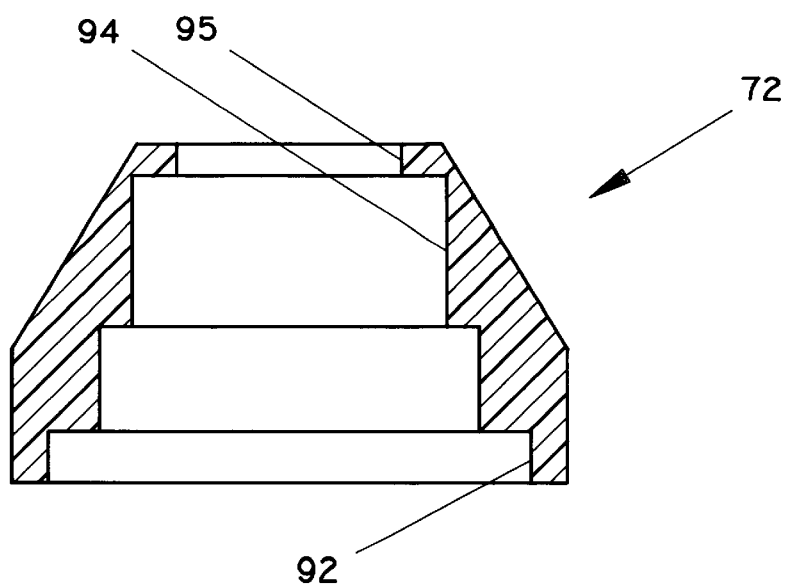
FIG. 6b is an enlarged cross sectional view of the end plug within the cavitation prevention assembly FIG. 2.

The tube retainer 70 is seated within the end plug 72, see FIGS. 2 and 6. The end plug 72 is press fit or welded into the valve body 12. The end plug 72 includes a first seat 92, a second seat 94 and a through bore 95. The first seat 92 has a diameter sized to allow for insertion of the tube retainer outer ring 88 and has a depth which guides the tube retainer as it is inserted into the end plug 72. The end plug second seat 94 is of a diameter and depth to allow for insertion of the tube retainer annulus 84 and the piston seal 74. As can be seen in FIG. 2, the piston seal 74 is trapped between the end plug second seat 94 and the tube retainer 70. As the tube retainer 70 is installed into the end plug 72, the tube retainer 70 compresses the piston seal 74 against the end plug second seat 94 and the piston tube 76. The piston seal 74 acts to prevent the flow of water around the annulus 84 and forces the water flowing through the flow passage 90 to flow through the inner diameter 96 of the annulus 84.

Figure 4A:
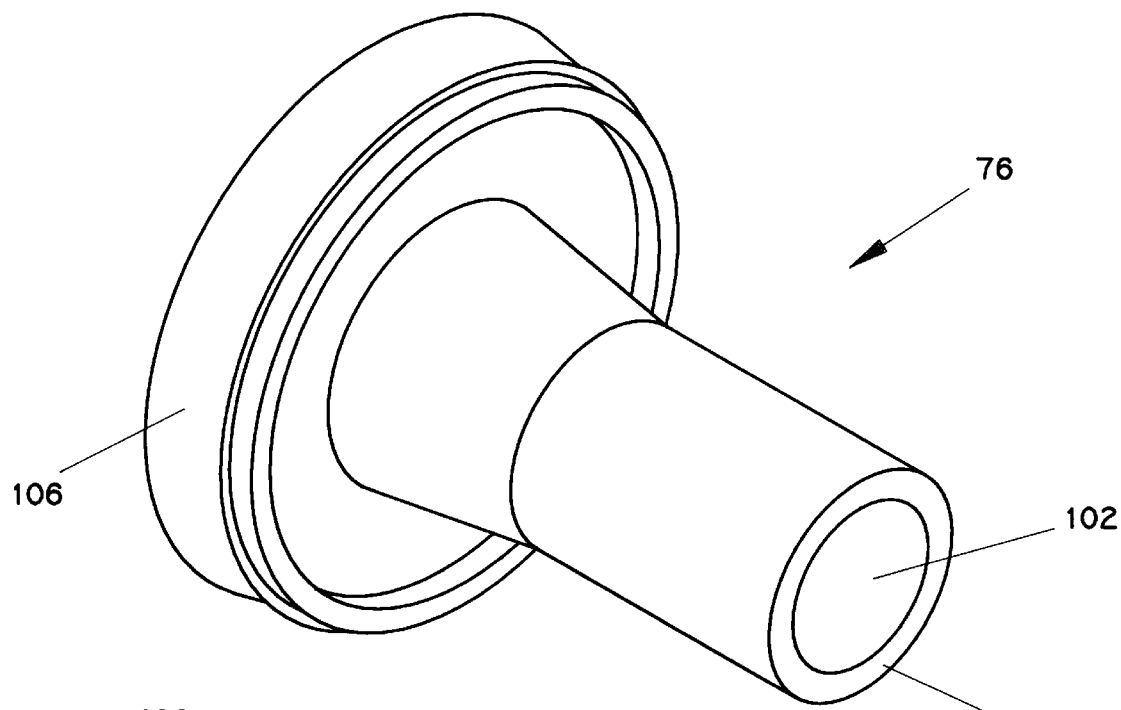
FIG. 4a is an enlarged isometric view of the piston tube within the cavitation prevention assembly FIG. 2.
Figure 4B:
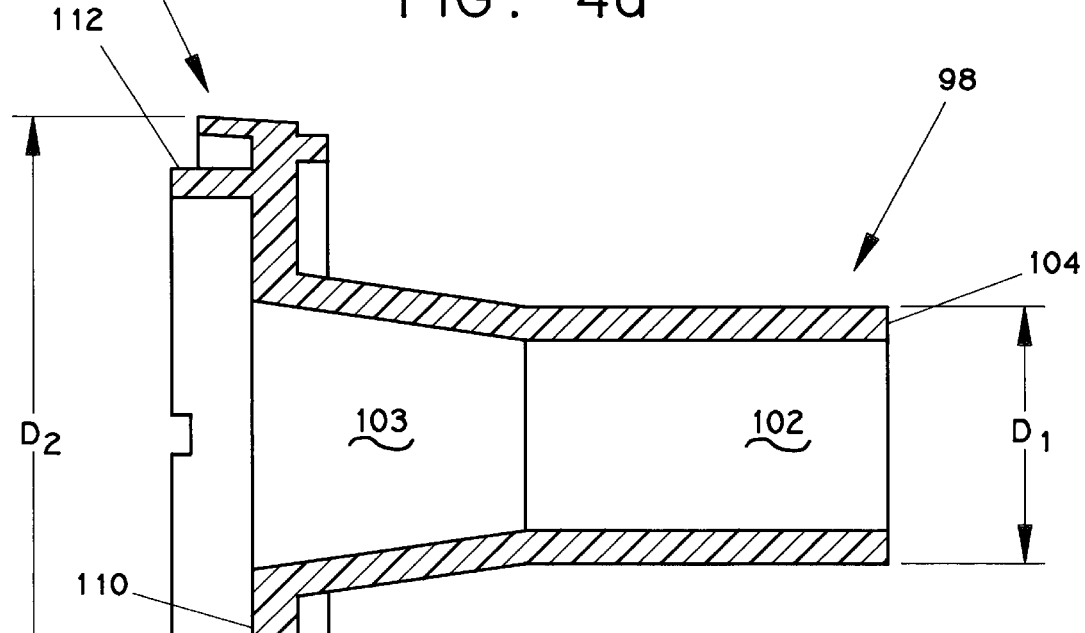
FIG. 4b is an enlarged cross sectional view of the piston tube within the cavitation prevention assembly FIG. 2.

Referring to FIGS. 4 through 6, the piston tube 76 includes a first end 98, a second end 100 and a longitudinal bore extending therethrough 102. The first end 98 includes a front surface 104 having a diameter $D_1$ and a corresponding area of $A_1$. The piston tube is slideably positioned within the end plug through bore 95 and the tube retainer inner diameter 96. The piston seal 74 fits around the outer diameter of the piston tube first end 98 to prevent the flow of fluid around the piston tube 76 and forces all the fluid to flow through the piston tube bore 102. The piston seal thereby isolates the pressure upstream of the end plug 72 from downstream of the end plug. The piston tube longitudinal bore 102 can be a straight through bore or can have a diffusing section 103 along its length as is shown in FIG. 4. The diffuser 103 acts to reduce the water velocity in the piston tube and recover lost water pressure as it flows through the bore 102.

The piston tube second end 100 includes a sealing surface 106, a stop 108, and a rear surface 110. The sealing surface 106 has a diameter sized to slideably fit within the cavitation prevention chamber 24 and provide a seal between the piston tube second end 100 and the valve body 12. The sealing surface 106 is formed at an angle to the centerline of the piston tube to allow for a slight deformation of the piston sealing surface 106 when the piston tube is installed in the cavitation prevention chamber 24 thereby acting as a lip seal. The lip seal is shown in the figures for illustration purposes only. A variety of sealing means could be used to slideably seal the piston tube to the valve body 12 such as an o-ring or a carbon seal. The sealing surface 106 isolates the pressure downstream of the piston tube second end 100 from the pressure in the cavitation prevention chamber 24 between the end plug 72 and the piston tube 76.

The stop 108 acts to limit movement of the piston tube in a direction away from the inlet opening 18. The stop 108 includes standoffs 112 which cooperate with the stop 108 to form a passage for fluid to communicate across the entire piston tube rear surface 110. The piston tube rear surface 110 has a diameter $D_2$ which is larger than the diameter of the piston tube front surface 104. The piston tube rear surface has an area of $A_2$ which is greater that the area $A_1$. In the embodiment shown in FIG. 2, the area $A_2$ is approximately 12 times the area of A1. This area ratio can be changed, along with the force of the piston spring 78, to change the regulating point of the cavitation prevention assembly. The rear surface 110 cooperates with the valve body 12 and the flow control member 52 to form the flow control chamber 26. The pressure within this flow control chamber 26 acts upon the area $A_2$ to move the piston tube 76 away from the stop 108 and towards the inlet 118.

The piston tube 76 is moveable between a first position wherein the stop 108 is in contact with the valve body 12 and the piston tube front surface 104 is axially spaced apart from the tube retainer 70 and a second position wherein the piston tube front surface 104 is in contact with the tube retainer 70 and the stop 108 is axially spaced apart from the valve body 12. The piston spring 78 is preferably a helical spring which is disposed around the piston tube 76 to bias the piston tube towards its first position. A vent 116 is provided in the cavitation prevention chamber 24 between the end plug 72 and the piston tube second end 100. The vent 116 is connected to a low pressure cavity when the valve is operating to prevent the buildup of pressure between the piston tube 76 and the end plug 72 as the piston tube moves between its two positions. In the embodiment shown in FIG. 2, the vent 116 is connected to the main chamber 30 where the pressure is close to atmospheric when the valve is open. The vent 116 could be connected to the atmosphere, but this could provide a leak path in case fluid crossed the piston seal 74 or the sealing surface 106.

The operation of the valve will now be described. When the valve actuator is de-energized the communication of fluid from the inlet opening 18 to the outlet 14 would be blocked. Upon energizing the actuator 20, the armature 40 moves from its closed position, to a second position wherein the diaphragm insert 36 and diaphragm 34 are spaced apart from the valving surface 46 allowing the communication of fluid with the outlet orifice 32. Upon energizing the actuator 20, fluid flow is initiated in the appliance valve 10 through the inlet opening 18. Once through the inlet, the liquid enters the cavitation prevention chamber 24 where it passes through the screen 68 and into the flow passages 90 of the tube retainer 70. The fluid passes through the tube retainer and enters the piston tube longitudinal bore 102 at the piston tube first end 98 and flows through the bore 102 and exits at the piston tube second end 100. The fluid leaves the piston tube 76 and enters the flow control member 52 and moves past the bullet 53, into the main chamber 30. Once into the main chamber 30 the fluid passes the valving surface 46 and out the outlet 14 to the appliance (not shown).

Without the cavitation prevention assembly 22, fluid flow through the valve 10 generates excessive noise as the fluid inlet pressure increases to a level where the pressure drop through the flow control member 52 is large. In the embodiment shown, at pressure drops greater than 30 psig cavitation occurs at the flow control member 52. The cavitation prevention assembly 22 controls the pressure drop across the flow control member 52 to a sufficiently low level to reduce this pressure drop.

As the fluid passes from the tube retainer 70 to the piston tube 76, it has a pressure of P1 that acts upon the area A1 to apply a force F1 to the first end of the piston tube. This force F1 acts, along with the force of the piston spring, to move the piston tube towards its first position. As the fluid moves along the length of the piston tube bore 102, there is a slight pressure loss. This pressure loss can be minimized by adding a diffuser 103 along the length of the piston tube bore 102. As the fluid exits the bore 102 at the piston tube second end 100, the fluid has a pressure P2. This pressure P2 acts on the piston tube second end area A2 creating a force F2. This force F2 acts on the piston tube second end 100 to move the piston tube from its first position towards its second position. When the force F2 is greater than the sum of the force F1 and the spring force of the piston spring 78, the piston will move off of the stop 108 and move towards its second position. If the force F2 is not sufficiently great to overcome the sum of the force F1 and the spring force of the piston spring 78, the piston tube 76 will remain at its first position. For the embodiment shown in FIG. 2, at a pressure of P1 less than or equal to 25 psig the sum of the forces F1 and the spring biasing force will be greater than the force F2 and the piston tube 76 will remain at its first position.

As the pressure level P1 increases, the force $F_2$ acting on the second end 100 increases more rapidly than the force at on the first end 98 $F_1$, due to the area ratio $A_2/A_1$. As a result, the piston tube tends to move towards its second position. As the piston tube moves towards its second position, the size of the flow passages 90 are reduced and the velocity of the fluid flowing through the piston tube bore 102 increases. The reduction in flow area acts as a pressure drop which reduces the fluid pressure at the piston tube second end 100. Again due to the area ratio $A_2/A_1$, the force acting on the second end 100 $F_2$ decreases more rapidly than the force at on the first end 98 $F_1$. As a result, the piston tube tends to move back towards its first position. This movement of the piston tube 76 as the inlet pressure $P_1$ changes, acts to regulate the pressure $P_2$ to a desired pressure. In the embodiment shown in FIG. 2, the desired pressure is 30 psig or less to prevent cavitation at the flow control member 52.

If the inlet pressure $P_1$ continues to increase, the piston tube will continue to move towards its second position adding additional pressure drop and thereby regulating the exit pressure $P_2$. At very high inlet pressures, the force $F_2$ will be sufficient to move the piston to its second position, wherein the piston tube first end 98 contacts the tube retainer annulus 84, blocking the inlet fluid flow. This blocked condition can only be momentary, because the stoppage of flow reduces the pressure $P_2$ to 0 psig, allowing the piston spring 78 to move the piston tube towards it first position, re-establishing fluid flow.

The cavitation prevention assembly 22 thereby can regulate the fluid pressure entering the flow control member 52 to a pre-selected pressure which will significantly reduce or eliminate cavitation of the fluid. The addition of the cavitation prevention assembly also has the advantage of improving the flow control accuracy of the appliance valve 10 and increasing the life of the flow control member 52. By limiting the operating pressure gradients over which the flow control member 52 must operate, the flow control responds with increased accuracy and the wear on the elastomer decreases.

Figure 7:
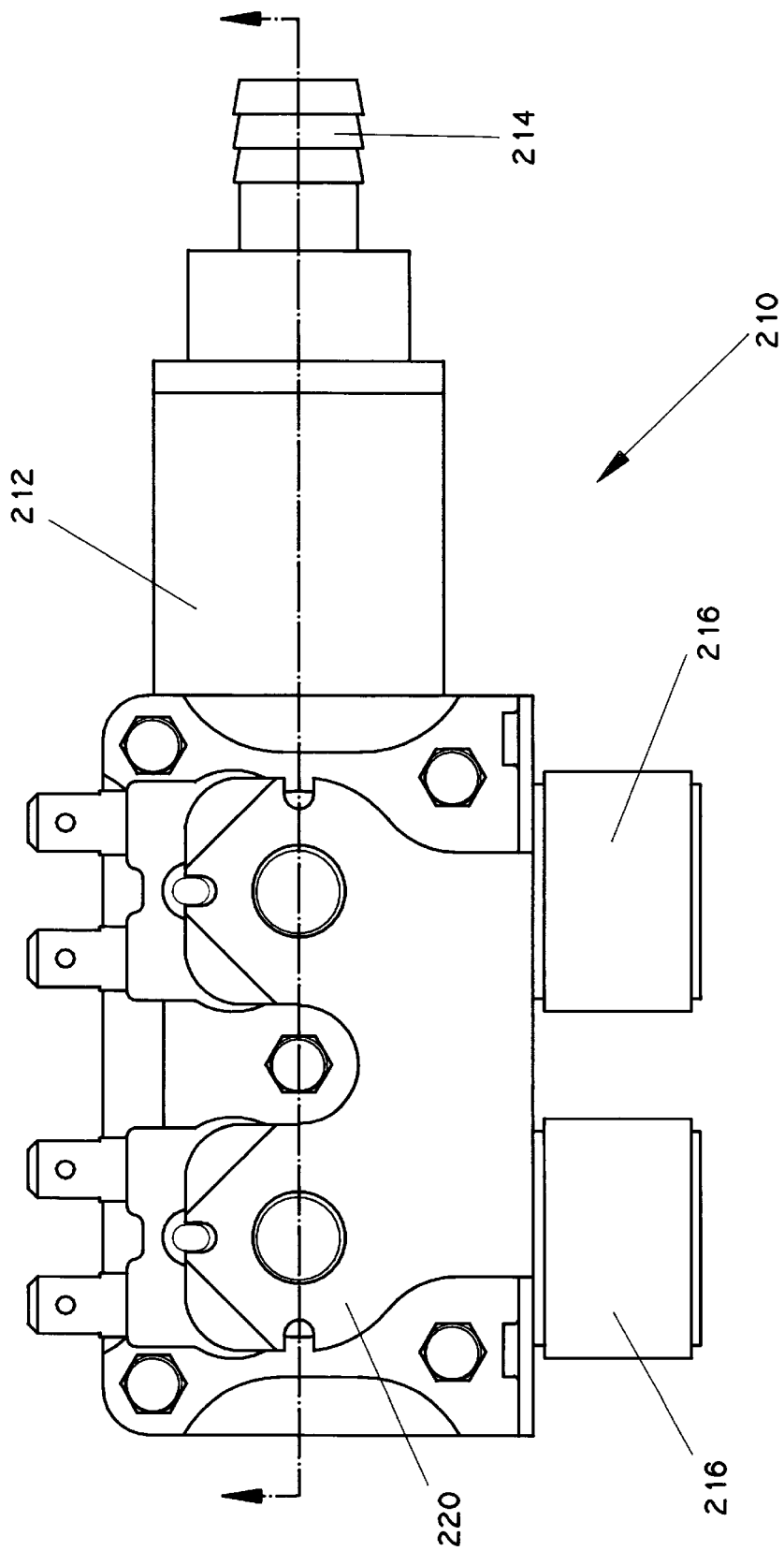
FIG. 7 is a view of an another type of appliance water valve which incorporates the features of the present invention therein.
Figure 8:
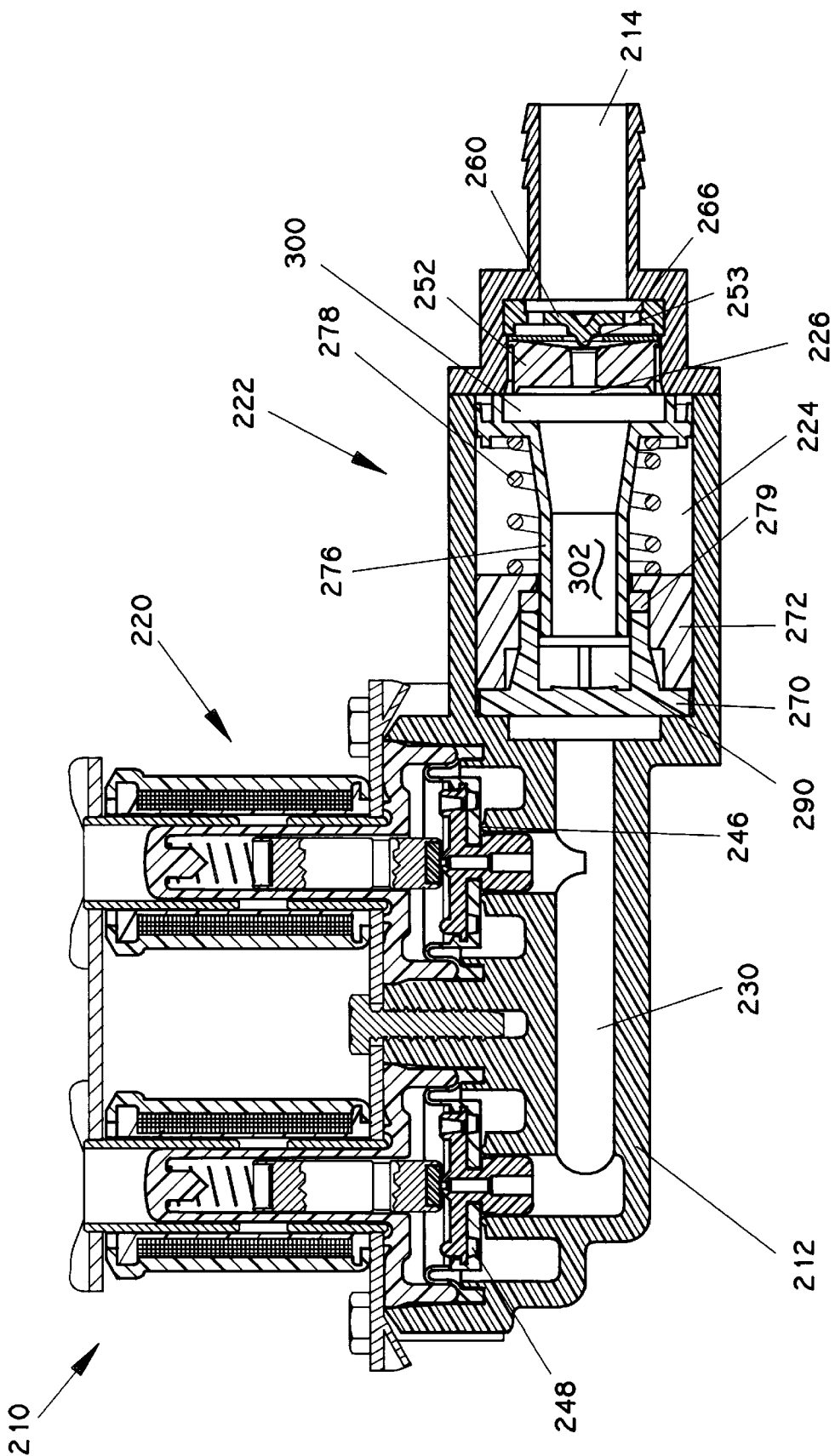
FIG. 8 is a cross sectional view of the water valve of FIG. 7 which incorporates the features of the present invention.

Referring to FIGS. 7 and 8, a second embodiment of the present invention is shown. In this embodiment, the cavitation prevention assembly 222 as described above is shown attached to another type of appliance valve 210. This type of valve is typically used in a washing machine as a laundry valve. This valve is controlled by an external source such as a timer which controls the energizing of the actuators 220. The valve 210 includes a valve body 212 which has two inlets 216, one for hot and one for cold water, and an outlet 214. In this embodiment, the valve mechanisms 248 and associated valve seats 246 are disposed upstream of the cavitation prevention chamber 224 and the flow control member 252. However, this change does not affect the operation of the cavitation prevention assembly 222. In this embodiment, when the actuators 220 are energized, fluid enters the inlets 218 and flows past the valve seats 246, entering the main chamber 230.

Once through the main chamber 230, the liquid enters the cavitation prevention chamber 224 where it passes through the flow passages 290 of the tube retainer 270. The fluid passes through the tube retainer and enters the piston tube longitudinal bore 302 at the piston tube first end 298 and flows through the bore 302 and exits at the piston tube second end 300. The fluid leaves the piston tube 276 and enters the flow control member 252 and moves past the bullet 253, through the dispersion holes 266 and exits the outlet 214 to the appliance (not shown). The cavitation prevention assembly 222 operates in the same manner as described for the first embodiment. Again the cavitation prevention assembly 222 acts to reduce the fluid pressure prior to the fluid entering the flow control chamber 226. By reducing the fluid pressure, the pressure drop across the flow control member 252 is reduced and cavitation is prevented and noise is reduced.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected. For example, the pressure regulator shown is not the only way to regulate the inlet pressure. It is just one embodiment of how to regulate pressure upstream of the flow control device to eliminate cavitation and associated noise.

What is claimed is:

1. A fluid valve assembly, comprising:

a valve body, said body defining an inlet, an outlet and a fluid passage communicating fluid therebetween;

a flow control member being positioned within said fluid passage and having a central passage through which said fluid advances; and a cavitation prevention assembly being positioned within said flow passage and being in flow communication with said inlet and said flow control member, said cavitation prevention assembly controlling the pressure of said fluid entering said central passage to a level sufficiently low to prevent cavitation of said fluid.

2. The fluid valve assembly of claim 1 wherein the cavitation prevention assembly includes a slideable piston tube, said piston tube being disposed in fluid communication with said inlet and said outlet, said piston tube having a first end and a second end, said first end including a front surface having a first area $A_1$, said second end having a second area $A_2$, said second area $A_2$ being larger than said first area $A_1$ thereby defining an area differential, said area differential acting in cooperation with said fluid flow to move said piston tube and thereby control the pressure of said fluid entering said central passage.

3. The fluid valve assembly of claim 2 wherein said piston tube includes a longitudinal extending bore and a sealing surface disposed at said second end thereby diverting all said fluid through said piston tube bore.

4. The fluid valve assembly of claim 3 wherein the cavitation prevention assembly further includes:

a tube retainer including a front surface, at least one rib, and an annulus, said front surface further including an outer ring and an inner surface, said ribs being sized and positioned to radially space the outer ring from said inner surface and to axially space the annulus from said front surface thereby defining a flow passage through said tube retainer, said annulus including an inner surface and an outer surface, said tube retainer being fixedly disposed within said flow passage and said front surface being in fluid communication with said fluid;

said piston tube first end being of a diameter to slideably fit within said tube retainer annulus inner surface, said piston tube bore being in fluid communication with said tube retainer flow passage.

5. The valve assembly of claim 4 further including a piston seal positioned to prevent the leakage of fluid between the piston tube first end and the tube retainer annulus inner surface.

6. The fluid valve assembly of claim 5 further including:

an end plug, said end plug having a first seat, a second seat and an extending bore, said end plug being fixedly disposed within said flow passage, said end plug being positioned to retain said tube retainer outer ring at said end plug first seat and said tube retainer annulus outer surface at said end plug second seat, said piston tube first end being slideably positioned within said end plug extending bore.

7. The fluid valve assembly of claim 2 further including a piston spring positioned within said cavitation prevention assembly, said piston spring having a preselected spring force, said spring force acting with said area differential to regulate the fluid flow to a preselected fluid pressure.

8. The fluid valve assembly of claim 2 wherein said piston spring biases said piston tube away from said fluid inlet, said spring and said area differential acting in combination to regulate the fluid flow to a preselected fluid pressure.

9. The fluid valve assembly of claim 2 wherein the piston tube area differential is substantially 12:1.

10. The assembly of claim 1, further comprising a screen which is interposed between said inlet and said cavitation prevention assembly.

11. An appliance valve noise suppression assembly, comprising:

a valve body, said body defining an inlet, an outlet and a fluid passage communicating therebetween;

a flow of water advancing from said inlet to said outlet and having a valve inlet pressure;

a flow control member being disposed in series with said inlet, said flow control member having a central passage through which the flow of water advances, said central passage interacting with said flow control member to limit the flow of water to a preselected level;

a regulating means disposed in series with said flow control member, said regulating means controls said flow of water through said central passage to a preselected pressure level.

12. The appliance water valve noise suppression assembly of claim 11 wherein the regulating means includes a piston slideably disposed within the valve body, said piston tube including a first end having a preselected area $A_1$, a second end having a preselected area $A_2$, and a longitudinal bore extending between said first end and said second end, said piston tube being moveable in response to said valve inlet pressure acting on said first end area $A_1$ and said second end area $A_2$.

13. The appliance water valve noise suppression assembly of claim 12 wherein the regulating means further includes a piston spring cooperating with said valve inlet pressure acting on the piston first and second ends to regulate said water pressure to said preselected pressure level.

14. The appliance water valve noise suppression assembly of claim 11 wherein the regulating means is positioned upstream of the flow control member.

15. The appliance water valve noise suppression assembly of claim 11 wherein the regulating means is positioned downstream of the flow control member.

16. The appliance water valve noise suppression assembly of claim 11 wherein the regulating means is inoperative when the valve inlet pressure is below substantially 25 psig.

17. The appliance water valve noise suppression assembly of claim 11 wherein the regulating means maintains said preselected pressure level to substantially 30 psig.

18. A water valve assembly having an inlet and an outlet, with said water valve assembly selectively enabling a flow of water to advance from said inlet to said outlet, comprising:

a cavitation prevention assembly positioned in said flow of water; and a valve mechanism positioned in said flow of water, said valve mechanism (1) allows said flow of water to pass from said inlet to said outlet in a first mode of operation, and (2) prevents said flow of water from passing from said inlet to said outlet in a second mode of operation;

wherein said cavitation prevention assembly includes a piston tube having a fluid channel through which said flow of water advances, said piston tube having an area differential between a first end and a second end, said piston tube being configured to slide within a chamber when said flow of water acts upon said area differential, said area differential varying as said piston tube slides within said chamber thereby regulating the pressure and velocity of said flow of water.

19. The water valve assembly of claim 18 wherein the piston tube is moveable between a second position wherein said piston tube first end acts to block the flow of water between said inlet and said outlet and a first position wherein said piston tube presents no flow restriction to said flow of water.

20. The water valve assembly of claim 19 wherein the cavitation prevention assembly further includes a piston spring acting upon said piston tube to bias said piston tube towards said first position.

21. The water valve assembly of claim 20 wherein the flow of water has a first valve inlet pressure, said first inlet pressure acting upon said area differential is not sufficient to overcome the piston spring biasing force and thereby the piston tube is retained at its first position.

22. The water valve assembly of claim 21 wherein the flow of water has a second valve inlet pressure which is greater than said first valve inlet pressure, said second inlet pressure acting upon said area differential to move said piston tube away from its first position towards its second position against the biasing of said piston spring.

23. The water valve assembly of claim 22 wherein the flow of water has a third inlet pressure which is greater than said second inlet pressure, said third inlet pressure acting upon said area differential to move said piston tube to its second position.

24. The water valve assembly of claim 23 wherein when said piston tube is moved to its second position, the flow of water is blocked and thereby the flow of water acting on the area differential acts to move the piston tube from its second position towards its first position.

* * * * *